United States Patent
Xu

(10) Patent No.: US 11,042,978 B2
(45) Date of Patent: Jun. 22, 2021

(54) METHOD AND APPARATUS FOR PERFORMING DAMAGE SEGMENTATION ON VEHICLE DAMAGE IMAGE

(71) Applicant: Advanced New Technologies Co., Ltd., Grand Cayman (KY)

(72) Inventor: Juan Xu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/154,361

(22) Filed: Jan. 21, 2021

(65) Prior Publication Data

US 2021/0150691 A1 May 20, 2021

Related U.S. Application Data

(63) Continuation of application No. PCT/CN2019/097904, filed on Jul. 26, 2019.

(51) Int. Cl.
*G06T 7/00* (2017.01)
*G06N 3/08* (2006.01)
*G06T 7/174* (2017.01)
*G07C 5/08* (2006.01)

(52) U.S. Cl.
CPC ............ *G06T 7/001* (2013.01); *G06N 3/08* (2013.01); *G06T 7/174* (2017.01); *G07C 5/0808* (2013.01)

(58) Field of Classification Search
None
See application file for complete search history.

(56) References Cited

U.S. PATENT DOCUMENTS

| | | | | |
|---|---|---|---|---|
| 2017/0284824 A1* | 10/2017 | Korzunov | .......... | G01C 21/3694 |
| 2017/0293894 A1* | 10/2017 | Taliwal | .............. | G06K 9/00671 |
| 2018/0189581 A1* | 7/2018 | Turcot | ................. | G06K 9/4628 |
| 2018/0253866 A1* | 9/2018 | Jain | ......................... | G06N 7/005 |
| 2018/0260793 A1* | 9/2018 | Li | .......................... | G06T 7/001 |
| 2019/0095877 A1* | 3/2019 | Li | .......................... | G06Q 10/20 |
| 2020/0118423 A1* | 4/2020 | Moura | ................. | G08G 1/0116 |

* cited by examiner

*Primary Examiner* — Jiangeng Sun
(74) *Attorney, Agent, or Firm* — Shun Yao; Park, Vaughan, Fleming & Dowler LLP

(57) ABSTRACT

One embodiment provides a method and system for performing segmentation on vehicle damage images. During operation, the system obtains a plurality of labeled segmentation and target detection samples. A labeled segmentation sample includes an image of a target object, a classification of the target object, and an outline of the target object; and a labeled target detection sample includes an image of a target object and a classification of the target object. The system trains a segmentation model, which comprises determining, based on labeled segmentation samples, mapping between a target detection parameter associated with target objects of a classification and a target segmentation parameter associated with outlines of the target objects; determining a target detection parameter for each classification; and obtaining a target segmentation parameter for each classification based on the corresponding target detection parameter and mapping, thereby determining the segmentation model for performing segmentation on vehicle damage images.

20 Claims, 12 Drawing Sheets

Acquire a plurality of segmentation samples labeled with both a target detection result and a target segmentation result, wherein a plurality of classifications with which target objects are labeled in these segmentation samples constitute a third classification subset ─ S810

Acquire a plurality of component detection samples labeled with a target detection result but not labeled with a target segmentation result, wherein a plurality of classifications with which target objects are labeled in these detection samples constitute a fourth classification subset, and the fourth classification subset includes classifications not belonging to the third classification subset ─ S820

Use the plurality of segmentation samples and the plurality of component detection samples to train a damage segmentation model, the model including a target detection parameter for detecting a component object and a target segmentation parameter for determining an outline of the component object ─ S830

FIG. 8

METHOD AND APPARATUS FOR PERFORMING DAMAGE SEGMENTATION ON VEHICLE DAMAGE IMAGE

RELATED APPLICATION

Under 35 U.S.C. § 120 and § 365(c), this application is a continuation of PCT Application No. PCT/CN2019/097904, entitled "METHOD AND APPARATUS FOR PERFORMING DAMAGE SEGMENTATION ON VEHICLE DAMAGE IMAGE," by inventor Juan Xu, filed 26 Jul. 2019, which claims priority to Chinese Patent Application No. 201811052994.6, filed on 10 Sep. 2018.

TECHNICAL FIELD

Embodiments of the specification relate to the field of vehicle damage determination, and in particular to a method and an apparatus for performing damage segmentation on a vehicle damage image.

BACKGROUND

In an automobile insurance claim scenario, acquiring, from a vehicle damage image, a pixel-level segmentation result of a damage object is very important both for improving accuracy of identifying the damage object and for precise positioning and display of the damage object.

Currently, a pixel-level damage region in a vehicle damage image is mainly determined by means of manual labeling. However, shapes of damage to appearance of vehicle bodies include a large quantity of discontinuous irregular scratches, deformations, rips, and the like, resulting in difficulty in determining a boundary of pixel points in a damage region. Therefore, it is difficult to perform manual labeling.

Therefore, a more effective method is needed, so as to rapidly and accurately perform damage segmentation on a vehicle damage image.

SUMMARY

In a method for performing damage segmentation on a vehicle damage image described in the specification, a damage segmentation model is determined on the basis of the idea of transfer learning, and is used to perform damage segmentation on a vehicle damage image.

According to a first aspect, a method and system for performing segmentation on a vehicle damage image are provided. During operation, the system obtains a plurality of labeled segmentation samples and a plurality of labeled target detection samples. A respective labeled segmentation sample includes an image of a target object, a classification of the target object, and an outline of the target object; and a respective labeled target detection sample includes an image of a target object and a classification of the target object. The system trains a segmentation model, which comprises: determining, based on the plurality of labeled segmentation samples, mapping between a target detection parameter associated with target objects of a respective classification and a target segmentation parameter associated with outlines of the target objects of the corresponding classification; determining a target detection parameter corresponding to each classification; and obtaining a target segmentation parameter for each classification based on the corresponding target detection parameter and mapping, thereby determining the segmentation model for performing segmentation on the vehicle damage image.

In a variation on this embodiment, determining the mapping further comprises: obtaining a target detection parameter corresponding to a first classification; obtaining a corresponding predictive target segmentation parameter based on initial mapping and the target detection parameter corresponding to the first classification; determining, based on the predictive target segmentation parameter, a predicted outline of a target object corresponding to a labeled segmentation sample associated with the first classification; and adjusting the initial mapping based at least on the predicted outline and the labeled outline of the target object.

In a variation on this embodiment, the target detection parameter corresponding to the first classification comprises a target classification parameter and a target boundary box parameter, and obtaining a corresponding predictive target segmentation parameter comprises obtaining the corresponding predictive target segmentation parameter based on the target classification parameter and/or the target boundary box parameter, and the initial mapping.

In a variation on this embodiment, determining the mapping comprises implementing a convolutional neural network.

In a variation on this embodiment, the plurality of labeled target detection samples comprise a plurality of labeled damage detection samples in which target objects are objects indicating vehicle damage, and the segmentation model is used to perform damage segmentation on the vehicle damage image.

In a variation on this embodiment, the plurality of labeled target detection samples comprise a plurality of labeled component detection samples in which target objects are vehicle components, and the segmentation model is used to perform component segmentation on the vehicle damage image.

In a variation on this embodiment, the plurality of labeled segmentation samples comprise a plurality of labeled damage segmentation samples in which target objects are objects indicating vehicle damage.

In a further variation, obtaining the plurality of labeled segmentation samples comprises: obtaining a predetermined quantity of labeled damage detection samples from a sample library; extracting, using a salience detection technique, a salient region from a boundary box in each labeled damage detection sample from the predetermined quantity of labeled damage detection samples; receiving a manual segmentation result for a portion of the predetermined quantity of labeled damage detection samples according to salient regions extracted from the portion of the predetermined quantity of labeled damage detection samples; including the portion of the predetermined quantity of labeled damage detection samples in the plurality of labeled segmentation samples; and including rest of the predetermined quantity of labeled damage detection samples in the plurality of labeled damage detection samples.

In a variation on this embodiment, the plurality of labeled segmentation samples comprise a plurality of labeled component segmentation samples in which target objects are vehicle components.

According to a second aspect, an apparatus for performing damage segmentation on a vehicle damage image is provided. The apparatus comprises: a first acquisition unit, configured to acquire a plurality of segmentation samples labeled with both a target detection result and a target segmentation result, wherein the target detection result comprises a classification and a boundary box of a target object, and the target segmentation result comprises an outline of the target object; a plurality of classifications with which the target objects are labeled in the plurality of segmentation samples constitute a first classification subset; a second acquisition unit, configured to acquire a plurality of damage detection samples labeled with a target detection result but not labeled with a target segmentation result, wherein a plurality of classifications with which target objects are labeled in the plurality of damage detection samples constitute a second classification subset, and the second classification subset comprises classifications not belonging to the first classification subset; and a training unit, configured to use the plurality of segmentation samples and the plurality of damage detection samples to train a damage segmentation model, the damage segmentation model comprising a target detection parameter for detecting a damage object and a target segmentation parameter for determining an outline of the damage object; wherein the training unit specifically comprises:

a first determination module, configured to determine, on the basis of the target detection results in the plurality of segmentation samples and the target detection results in the plurality of damage detection samples, a target detection parameter corresponding to each classification in a classification set consisting of the first classification subset and the second classification subset; a second determination module, configured to determine, on the basis of the target detection results and the target segmentation results in the plurality of segmentation samples, a weight transfer function, the weight transfer function indicating a mapping from the target detection parameter to the target segmentation parameter; and an input module, configured to input the target detection parameter corresponding to each classification to the weight transfer function to obtain a target segmentation parameter corresponding to each classification, so as to determine the damage segmentation model used to perform damage segmentation on a vehicle damage image.

According to a third aspect, an apparatus for performing component segmentation on a vehicle damage image is provided. The apparatus comprises: a first acquisition unit, configured to acquire a plurality of segmentation samples labeled with both a target detection result and a target segmentation result, wherein the target detection result comprises a classification and a boundary box of a target object, and the target segmentation result comprises an outline of the target object; a plurality of classifications with which the target objects are labeled in the plurality of segmentation samples constitute a third classification subset; a second acquisition unit, configured to acquire a plurality of component detection samples labeled with a target detection result but not labeled with a target segmentation result, wherein a plurality of classifications with which target objects are labeled in the plurality of component detection samples constitute a fourth classification subset, and the fourth classification subset comprises classifications not belonging to the third classification subset; and a training unit, configured to use the plurality of segmentation samples and the plurality of component detection samples to train a component segmentation model, the component segmentation model comprising a target detection parameter for detecting a component object and a target segmentation parameter for determining an outline of the component object; wherein the training unit specifically comprises:

a first determination module, configured to determine, on the basis of the target detection results in the plurality of segmentation samples and the target detection results in the plurality of component detection samples, a target detection parameter corresponding to each classification in a classification set consisting of the third classification subset and the fourth classification subset; a second determination module, configured to determine, on the basis of the target detection results and the target segmentation results in the plurality of segmentation samples, a weight transfer function, the weight transfer function indicating a mapping from the target detection parameter to the target segmentation parameter; and an input module, configured to input the target detection parameter corresponding to each classification to the weight transfer function to obtain a target segmentation parameter corresponding to each classification, so as to determine the component segmentation model used to perform component segmentation on a vehicle damage image.

According to a fourth aspect, a computer-readable storage medium is provided, on which a computer program is stored, wherein the computer program, when executed on a computer, causes the computer to perform the method according to the first aspect or the second aspect.

According to a fifth aspect, a computing device is provided, comprising a memory and a processor, characterized in that the memory stores executable code, and the processor, when executing the executable code, implements the method according to the first aspect or the second aspect.

In the method for performing damage segmentation on a vehicle damage image disclosed by the embodiments of the specification, on the basis of segmentation samples corresponding to a first classification subset and labeled with both a target detection result and a target segmentation result and damage detection samples corresponding to a second classification subset and labeled with a target detection result but not labeled with a target segmentation result, a target detection parameter and a target segmentation parameter corresponding to each classification in a classification set consisting of the first classification subset and the second classification subset can be determined, so as to determine a damage segmentation model used to perform damage segmentation on a vehicle damage image.

BRIEF DESCRIPTION OF THE DRAWINGS

To more clearly describe the technical solutions of the plurality of embodiments disclosed by the specification, the following briefly introduces the accompanying drawings for describing the embodiments. It is apparent that the accompanying drawings described below are only the embodiments disclosed by the specification, and a person of ordinary skill in the art can still derive other drawings from these accompanying drawings without creative efforts.

FIG. 8 is a flowchart of a method for performing component segmentation on a vehicle damage image according to an embodiment.

DETAILED DESCRIPTION

A plurality of embodiments disclosed by the specification are described below with reference to the accompanying drawings.

Embodiments of the specification disclose a method for performing damage segmentation on a vehicle damage image. The damage segmentation refers to performing regional extraction on a damage object having a target classification and a clear boundary in a vehicle damage image, and the regional extraction can be manifested as determining an outline of the damage object.

The method specifically includes determining a damage segmentation model, so that the vehicle damage image can be inputted to the model, and then the target classification of the damage object (briefly referred to as a damage classification in the following) and a segmentation outline of the damage object can be acquired. The following first introduces an application scenario of the damage segmentation model.

Figure 1:
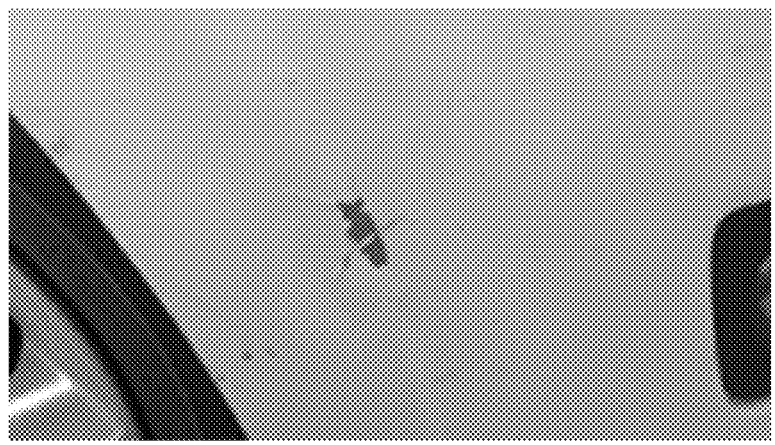
FIG. 1 shows a photo of a part of a vehicle according to an example.
Figure 2:
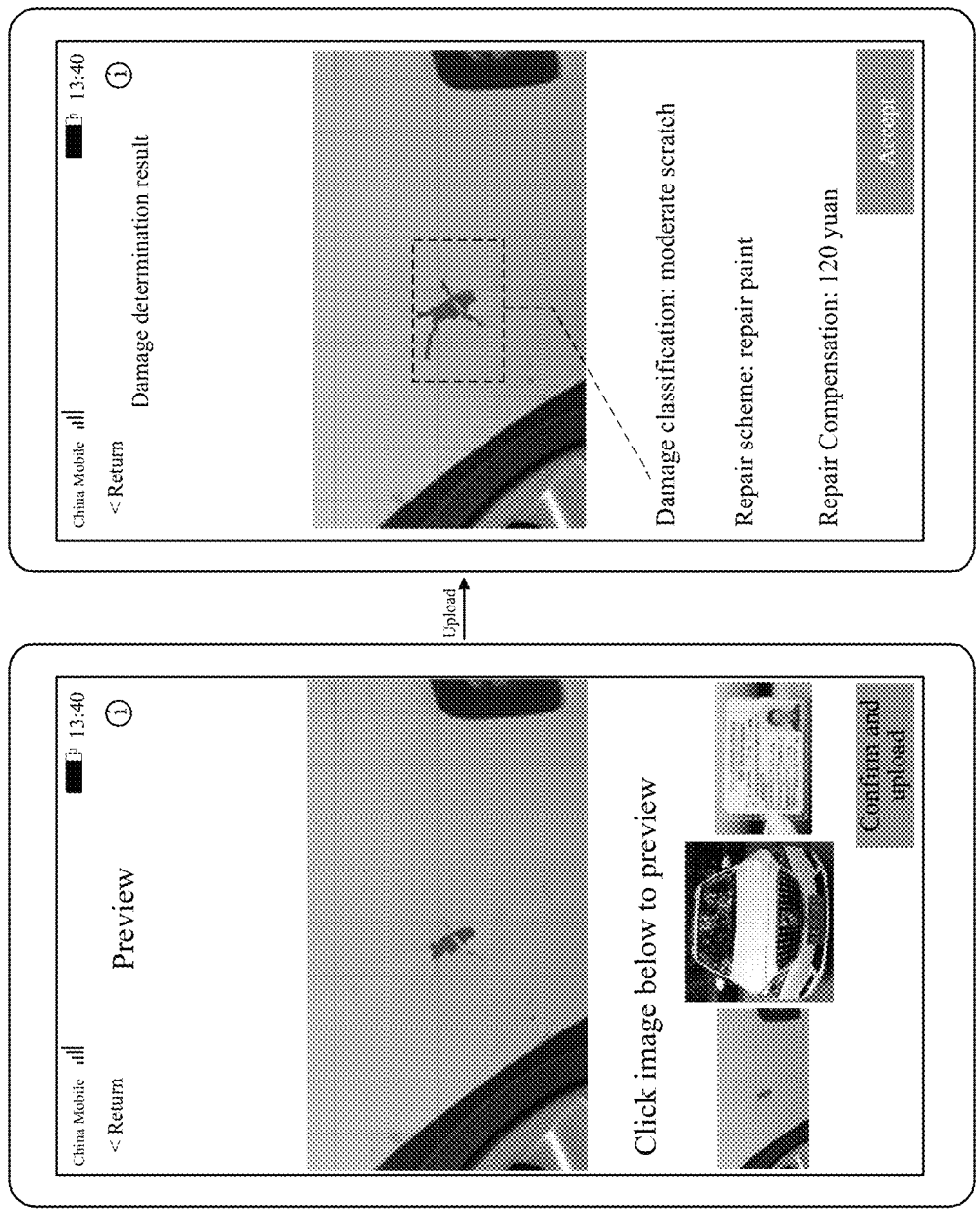
FIG. 2 is a schematic view of a change of an interface of a damage determination client according to an example.

The damage segmentation model can be applied to a damage determination client provided to a user. According to one example, in the scene of an accident, a user can use a terminal, such as a mobile phone, a tablet computer, or the like, to take a photo of the scene, such as an image of a part of a vehicle shown in FIG. 1, and upload the captured photo to a damage determination client on the terminal. Then, the damage determination client can use the damage segmentation model to determine vehicle damage information corresponding to the photo of the scene. For example, as shown in FIG. 2, it can be determined that a vehicle damage classification is a moderate scratch, and an outline of the scratch-caused damage can be determined. Further, a repair scheme and an associated compensation amount corresponding to the damage information can be provided. For example, the repair scheme is to repair paint, and the insurance repair compensation amount is 120 yuan.

Regarding training of the damage segmentation model, in an implementation scheme, a conventional machine learning method can be used, and training is performed on the basis of a large number of manually labeled damage segmentation samples. In this scheme, a staff member usually uses a painting tool such as a brush to approximately draw a damage region, and performs damage pixel point labeling. This labeling technique is not precise, especially in cases in which a large amount of discontinuous irregular damage, such as scratches, deformations, rips, and the like, occur. Since it is difficult to determine a pixel point boundary of the damage region, labeling is usually performed on the level of an entire area, and a large amount of pixel-level noise occurs in the labeling. In addition, the manual labeling in this scheme has overly high costs and, thus, is difficult to implement.

In view of the aforementioned observations and statistics, embodiments of the specification disclose a method for performing damage segmentation on a vehicle damage image. A transfer learning method is used to determine a damage segmentation model. Transfer learning can be understood as using prior knowledge to learn new knowledge, and its core is to find similarity between the prior knowledge and the new knowledge. Further, in an implementation, the damage segmentation model can be determined on the basis of a large number of segmentation samples corresponding to a non-damage object having a feature similar to that of a damage object, and these segmentation samples are usually easy to acquire. For example, segmentation samples in which target objects are component objects can be used. Because an outline feature of a component is similar to an outline feature of damage, and a component outline is relatively regular compared with a damage outline, therefore, it is relatively easy to acquire a large number of component segmentation samples labeled with segmentation results.

According to a specific embodiment, firstly, a plurality of segmentation samples having a feature similar to that of vehicle damage and a plurality of damage detection samples can be acquired. A segmentation sample is labeled with a target detection result (including a classification and a boundary box of a target object) and a target segmentation result, and a plurality of classifications corresponding to the plurality of segmentation samples constitute a classification set A. A damage detection sample is labeled with a target detection result, but is not labeled with a target segmentation result, and a plurality of classifications corresponding to the plurality of damage detection samples constitute a classification set B. The classification set B includes classifications not belonging to the classification set A. Then, a relationship between the target detection result and the target segmentation result corresponding to each classification in the segmentation sample is determined. Then, this relationship is transferred to the damage detection sample. Therefore, a target segmentation parameter corresponding to each classification in classification set B can be determined on the basis of this relationship, and can be used to perform segmentation on a damage object in the vehicle damage image and corresponding to classification set B. The following describes specific implementation steps of the aforementioned process.

Figure 3:
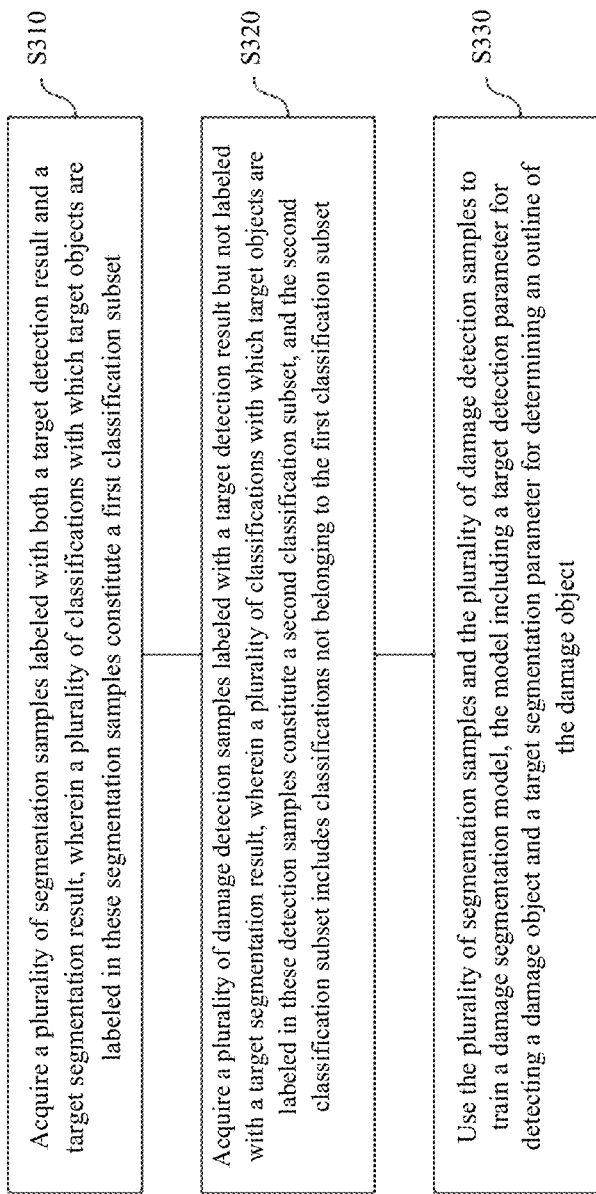
FIG. 3 is a flowchart of a method for performing damage segmentation on a vehicle damage image according to an embodiment.

FIG. 3 illustrates a flowchart of a method for performing damage segmentation on a vehicle damage image according to an embodiment. The executive body of the method can be a device having a processing capability: a server, a system, or an apparatus. As shown in FIG. 3, a process of the method includes the following steps: step S310, acquire a plurality of segmentation samples labeled with both a target detection result and a target segmentation result, wherein a plurality of classifications with which target objects are labeled in these segmentation samples constitute a first classification subset; step S320, acquire a plurality of damage detection samples labeled with a target detection result but not labeled with a target segmentation result, wherein a plurality of classifications with which target objects are labeled in these detection samples constitute a second classification subset, and the second classification subset includes classifications not belonging to the first classification subset; and step S330, use the plurality of segmentation samples and the plurality of damage detection samples to train a damage segmentation model, the model including a target detection parameter for detecting a damage object and a target segmentation parameter for determining an outline of the damage object.

Firstly, in step S310, the plurality of segmentation samples labeled with both the target detection result and the target segmentation result are acquired.

Specifically, the target detection result includes a classification and a boundary box of a target object, and the target segmentation result includes an outline of the target object, namely a mask corresponding to the outline of the target object. It should be noted that the target object is an object having a feature similar or close to that of vehicle damage, thereby ensuring that the trained damage segmentation model can achieve a good segmentation effect.

In an embodiment, the target object can include a vehicle component, and therefore the plurality of segmentation samples can include a plurality of component segmentation samples. Further, according to a specific embodiment, the plurality of component segmentation samples can include component segmentation samples acquired on the basis of manual labeling. It should be noted that an outline of a vehicle component in a vehicle damage image is relatively regular, so that performing manual labeling on a segmentation result of the vehicle component is feasible. According to another specific embodiment, the plurality of component segmentation samples can further include component segmentation samples acquired on the basis of a component segmentation model. In an example, the component segmentation model can be acquired by training on the basis of the aforementioned manually labeled component segmentation samples, and then a large number of vehicle damage images are inputted to the component segmentation model, so that more images having component segmentation results are acquired, and these images are used as a portion of the plurality of component segmentation samples.

Figure 4:
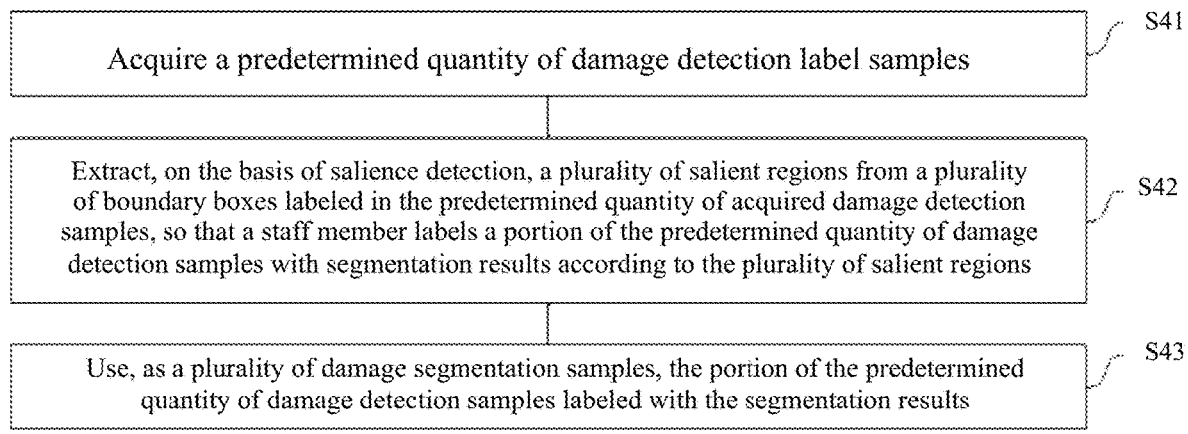
FIG. 4 is a flowchart of a damage segmentation sample acquisition method according to an embodiment.

In another embodiment, the target object can include vehicle damage, and therefore the plurality of segmentation samples can include a plurality of damage segmentation samples. It should be noted that the number of classifications corresponding to these damage segmentation samples is less than or far less than the number of classifications corresponding to damage detection samples mentioned below. Further, as shown in FIG. 4, the damage segmentation sample can be acquired by means of the following steps:

Firstly, in step S41, acquire a predetermined quantity of damage detection samples from a damage sample library.

Specifically, the damage detection sample refers to a sample labeled with a target detection result but not labeled with a target segmentation result. That is, the damage detection sample is labeled with a classification of a damage object and a boundary box in which the damage object is located, but is not labeled with a segmentation result of the damage object.

It can be understood that the damage detection sample can be easily acquired. In an example, the operation of manually labeling a damage box and a damage classification in a vehicle damage image is relatively easy, so that a large number of damage detection samples can be acquired on the basis of manual labeling. In another example, on the basis of an existing damage detection model and a huge number of vehicle damage images acquired from an insurance company, a corresponding damage detection result can be acquired, and a damage detection sample can be determined according to the damage detection result.

In a specific embodiment, the predetermined quantity can be determined by a staff member according to practical experience.

Then, in step S42, extract, on the basis of salience detection, a plurality of salient regions from a plurality of boundary boxes labeled in the predetermined quantity of acquired damage detection samples, so that a staff member can perform segmentation result labeling on a portion of the predetermined quantity of damage detection samples according to the plurality of salient regions.

It should be noted that the salience detection (also referred to as a visual attention mechanism) refers to extracting a salient region (namely a region that human beings are interested in) in an image by using an intelligent algorithm to simulate a visual feature of human beings. Generally, a salient region has a certain structure and texture, is stimulus in color, and the salient region is quite different from surrounding regions. On the basis of these simple salience detection principles, salience detection can be performed.

Figure 5:
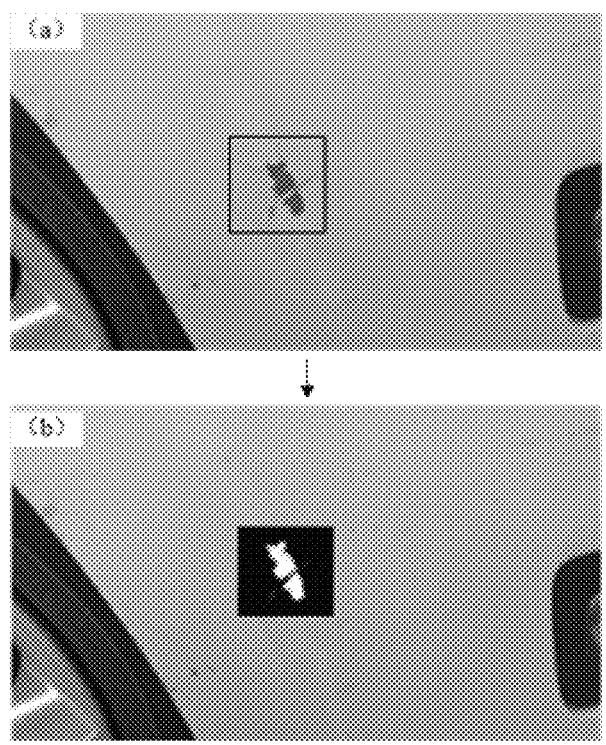
FIG. 5 is a schematic view of damage object extraction based on salience detection according to an embodiment.

For the plurality of boundary boxes labeled in the damage detection samples, the damage objects therein are quite different from other regions in the boundary boxes in terms of color, structure, and texture. Therefore, salience detection can be performed on an image in the boundary box so as to rapidly extract a damage object therein. In a specific example, according to a damage box in an image of a part of a vehicle body shown in FIG. 5(a), a saliency map shown in FIG. 5(b) can be acquired, in which the white part is a detected damage object. Therefore, a plurality of damage objects can be correspondingly extracted from a plurality of boundary boxes of the predetermined quantity of damage detection samples.

Further, in a specific embodiment, a salient region extracted on the basis of salience detection can be directly automatically labeled as a segmentation result of a corresponding damage object. However, on one hand, dust, stains, and other salient objects other a damage object may be present in a boundary box, and on the other hand, a large variety of vehicle damage exists, and includes a large amount of discontinuous damage or slight damage. Therefore, for some damage detection samples, it is possible that a region covered by a damage object cannot be completely and accurately extracted therefrom on the basis of salience detection. Therefore, in another specific embodiment, the plurality of extracted salient regions can be provided to a staff member, so that the staff member labels a portion of the predetermined quantity of damage detection samples with segmentation results according to the plurality of salient regions, and for example, the staff member can filter or correct the salient regions so as to obtain damage segmentation samples having more precise segmentation results.

According to the above, the portion of the predetermined quantity of damage detection samples labeled with the segmentation results can be acquired. Then in step S43, use the acquired portion of the predetermined quantity of damage detection samples as the plurality of damage segmentation samples.

It can be understood that the plurality of acquired segmentation samples can include the aforementioned plurality of component segmentation samples and/or the plurality of damage segmentation samples acquired on the basis of the salience detection. In addition, in a specific embodiment, the plurality of segmentation samples can further include a small number of damage segmentation samples acquired on the basis of manual labeling. In another specific embodiment, the plurality of segmentation samples can further include other segmentation samples having a feature similar to that of the damage object, such as a segmentation sample in which a target object is a leaf of a plant.

According to the above, the plurality of segmentation samples labeled with both the target detection result and the target segmentation result can be acquired, and the plurality of classifications with which the target objects are labeled in these segmentation samples constitute the first classification subset. Then, in step S320, acquire a plurality of damage detection samples labeled with a target detection result but not labeled with a target segmentation result.

It should be noted that a plurality of classifications with which target objects are labeled in the plurality of damage detection samples constitute a second classification subset, and the second classification subset includes classifications not belonging to the first classification subset. In an embodiment, the plurality of segmentation samples acquired in step S310 include component segmentation samples in which target objects are component objects. However, target objects of damage detection samples are damage objects. Obviously, the classifications in the first classification subset are component classifications, and the classifications in the second classification subset are damage classifications. Damage classifications are different from component classifications. In another embodiment, a portion of the plurality of segmentation samples acquired in step S310 is damage segmentation samples. It can be seen from the above that damage classifications corresponding to these damage segmentation samples are limited. Therefore, the number of damage classifications corresponding to damage segmentation samples is less than or far less than the number of damage classifications in the second classification subset.

In addition, for descriptions of the damage detection samples, reference can be made to the related descriptions in step S41 described above.

According to a specific embodiment, after the predetermined quantity of damage detection samples are acquired and the portion of the predetermined quantity of damage segmentation samples labeled with the segmentation results are acquired, the rest (for example, the predetermined quantity minus the quantity of the portion) of the damage detection samples are used as a portion of the plurality of damage detection samples acquired in this step.

According to the above, a plurality of segmentation samples can be acquired in step S310, and a plurality of damage detection samples can be acquired in step S320. Then, in step S330, use the plurality of segmentation samples and the plurality of damage detection samples to train a damage segmentation model, the damage segmentation model including a target detection parameter for detecting a damage object and a target segmentation parameter for determining an outline of the damage object.

Figure 6:
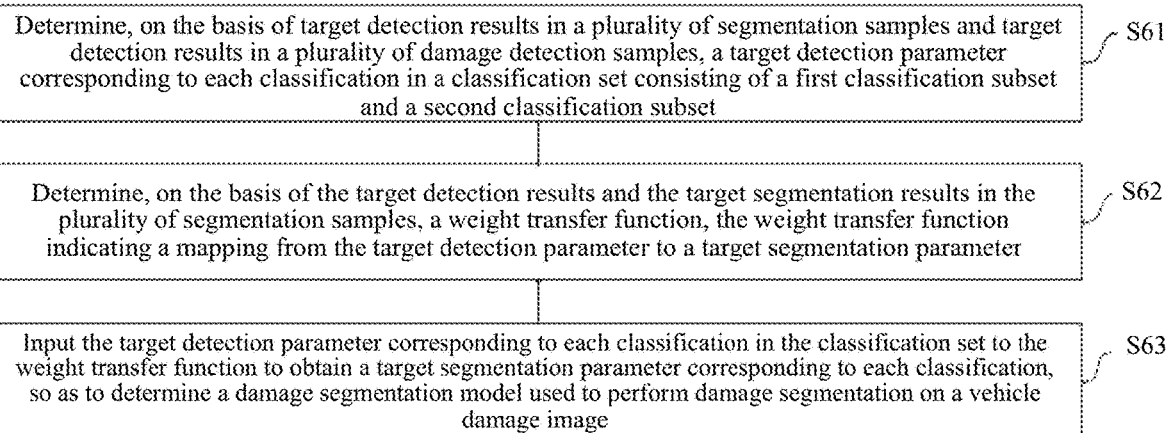
FIG. 6 is a flowchart of a damage segmentation model training method according to an embodiment.

The following describes a training process of the damage segmentation model with reference to FIG. 6. As shown in FIG. 6, training the damage segmentation model can include the following steps:

Firstly, in step S61, determine, on the basis of the target detection results in the plurality of segmentation samples and the target detection results in the plurality of damage detection samples, a target detection parameter corresponding to each classification in a classification set consisting of the first classification subset and the second classification subset.

In an embodiment, an existing target detection algorithm, such as faster R-CNN, R-FCN, SSD, or the like, can be used to determine the target detection parameter corresponding to each classification in the classification set.

Then, in step S62, determine, on the basis of the target detection results and the target segmentation results in the plurality of segmentation samples, a weight transfer function, the weight transfer function indicating a mapping from the target detection parameter to the target segmentation parameter.

The weight transfer function indicates a mapping from the target detection parameter to the target segmentation parameter, so that in an embodiment, the target detection parameter and the target segmentation parameter are separately determined, and a mapping relationship therebetween is mathematically determined, and used as the weight transfer function. Specifically, firstly, the target detection parameter corresponding to each classification in the first classification subset can be determined according to the target detection results in the segmentation samples, and with reference to the target segmentation results, the target segmentation parameter corresponding to each classification in the first classification subset is determined; then, the weight transfer function can be determined according to the target detection parameter and the target segmentation parameter corresponding to each classification.

In another embodiment, the weight transfer function is determined by training. In this embodiment, an initial weight transfer function is determined first (that is, a preliminary function parameter is determined); then, the weight transfer function is acquired through training by using the target detection parameter as input, by using the target segmentation result as a label, and by means of function parameter adjustment. Some steps in the training process are described below by using an example in which the first classification subset includes a certain classification (referred to as a first classification in the following). Firstly, acquire a target detection parameter corresponding to the first classification; then, input the target detection parameter corresponding to the first classification to an initial weight transfer function to obtain a corresponding predictive target segmentation parameter; then, determine, on the basis of the predictive target segmentation parameter, a predicted target segmentation result corresponding to a segmentation sample of the first classification; and then, adjust the initial weight transfer function at least on the basis of the predicted target segmentation result and the target segmentation result with which the segmentation sample of the first classification is labeled. In this way, the weight transfer function is acquired by performing training.

In a specific embodiment, the target detection parameter corresponding to the first classification includes a target classification parameter and a target boundary box parameter, and correspondingly, inputting the target detection parameter corresponding to the first classification to an initial weight transfer function can include: inputting the target classification parameter and/or the target boundary box parameter to the initial weight transfer function. In an example, the target detection parameter can be a combination of the target classification parameter and the target boundary box parameter.

In a specific embodiment, the weight transfer function can be represented as $$\omega_{seg} = \tau(\omega_{det}; \theta) \qquad (1)$$

where $\omega_{det}$ represents a target detection function of any classification; $\omega_{seg}$ represents a target segmentation parameter corresponding to the same classification as $\omega_{det}$, and $\theta$ is a learning parameter independent of classification. In the initial weight transfer function, $\theta$ can be set to $\theta_0$, and specifically, can be set to a random value.

In a specific embodiment, the weight transfer function can be implemented by means of a convolutional neural network. That is, operation of the weight transfer function is implemented by means of a combination of neurons of a neural network. Correspondingly, training the weight transfer function includes: adjusting and determining an operational parameter of the neurons in the neural network, a weight parameter of connections between the neurons, and the like.

In a specific embodiment, adjusting the initial weight transfer function can include: determining, on the basis of the predicted target segmentation result corresponding to one or more classifications in the first classification subset and the target segmentation result with which the segmentation sample is labeled, a loss function corresponding to the target segmentation result, and adjusting the initial weight transfer function by means of error backpropagation or a gradient descent technique.

According to a specific example, firstly, a target detection parameter $\omega_{det}$ corresponding to a first classification c is acquired; then, $\omega_{det}^c$ is inputted to the initial weight transfer function represented by the following expression:

$$\omega_{seg} = \tau(\omega_{det}; \theta_0) \quad (2)$$

A target segmentation parameter $\omega_{seg}^c$ corresponding to the first classification c is acquired. Then, on the basis of $\omega_{seg}^c$, a predicted target segmentation result corresponding to the segmentation sample of the first classification is determined; then, the initial weight transfer function is adjusted on the basis of this predicted target segmentation result and the target segmentation result with which the segmentation sample of the first classification c is labeled, that is, $\theta_0$ is adjusted to $\theta_1$.

Further, after the initial weight transfer function is adjusted, on the basis of this adjustment, segmentation samples other than the acquired segmentation samples can be used to perform subsequent adjustment, so as to determine the weight transfer function. In an example, determining the weight transfer function includes determining the parameter value of $\theta$ in formula (1).

It should be noted that step S61 and step S62 can be performed simultaneously independently, and can also be performed independently one after the other, or step S62 can be performed simultaneously as a branch of step S61 so as to reduce resource consumption.

According to the above, the weight transfer function can be determined, and this function indicates a mapping from the target detection parameter to the target segmentation parameter. Then, in step S63, input the target detection parameter determined in step S61 and corresponding to each classification in the classification set to the weight transfer function to obtain a target segmentation parameter corresponding to each classification, so as to determine the damage segmentation model used to perform damage segmentation on a vehicle damage image.

In this way, the target segmentation parameter corresponding to each classification in the classification set consisting of the first classification subset and the second classification subset can be acquired, and can be used to perform segmentation on a target object included in the image and corresponding to each classification in the classification set. This also means, for a portion of the classifications in the second classification subset, in a situation where a training sample set includes only detection samples corresponding thereto, but does not include segmentation samples corresponding thereto, then a corresponding target segmentation parameter can also be acquired by using the method provided by the embodiments of the specification, and used to perform damage segmentation on vehicle damage images corresponding to these classifications.

Figure 7:
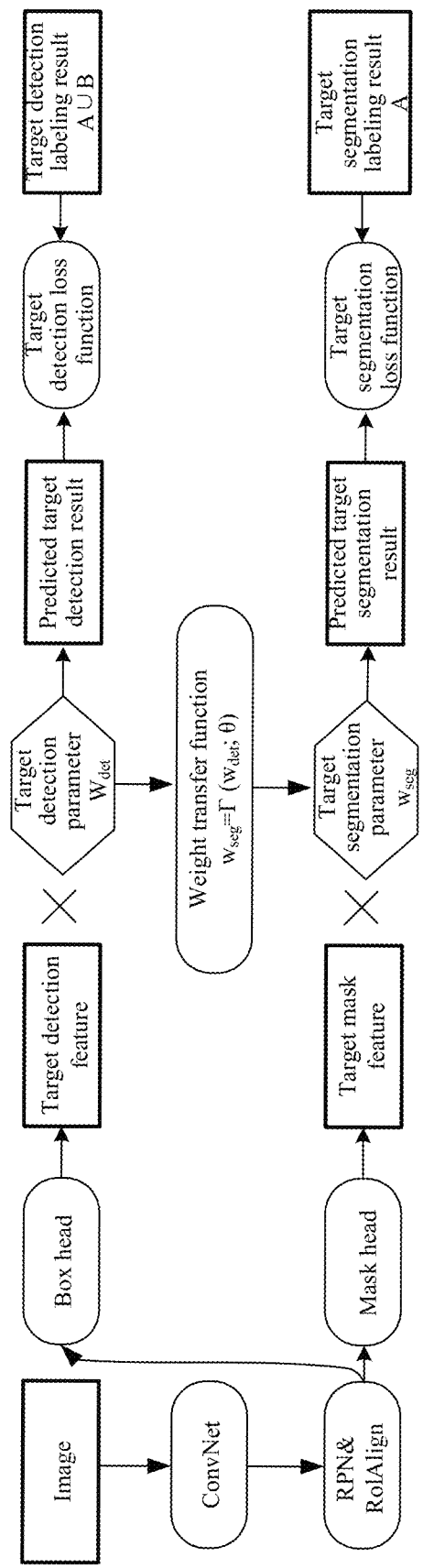
FIG. 7 is a diagram of a mask R-CNN architecture based on transfer learning according to an embodiment.

The following describes step S330 in further detail with reference to a specific example. As shown in FIG. 7, FIG. 7 illustrates a diagram of a mask R-CNN architecture based on transfer learning. Assumed that the first classification subset is a set A, and the second classification subset is a set B. A∪B indicates the union of set A and set B, and is the aforementioned classification set.

1. For any image in the inputted training sample set, firstly, a shared convolutional layer (ConvNet) is used to perform feature extraction on the entire image; then, acquired feature maps are inputted to a region proposal network (RPN for short) so as to generate a region to be detected; and region features of the to-be-detected region are extracted and aggregated from the feature maps by means of ROI Align.

When this image is an image corresponding to the segmentation sample:

1) Box features are extracted from the aggregated region features by means of a box head; on the basis of the box features and the target detection parameter (box weights), which can be represented by $w_{det}$, a predicted detection result (box predictions) can be determined; then, on the basis of the predicted detection result and a label detection result (box labels in A∪B) corresponding to this image, a loss function (box loss) corresponding to the detection results is calculated, so as to adjust $w_{det}$ corresponding to a classification of this image.

2) Then, on the basis of the weight transfer function, the target segmentation parameter (mask weights), which can be represented by $w_{seg}$, corresponding to this classification is determined, wherein the weight transfer function is used to indicate the mapping relationship between the target detection parameter and the target segmentation parameter.

3) Mask features are extracted from the aggregated region features by means of a mask head; a predicted segmentation result is determined on the basis of the mask features and $w_{seg}$; then, a loss function (mask loss) corresponding to the segmentation result is calculated on the basis of the predicted segmentation result and a labeled segmentation result corresponding to this image, and then the weight transfer function is adjusted, that is, a learning parameter in the weight transfer function is adjusted.

Therefore, the weight transfer function can be determined on the basis of the plurality of segmentation samples.

In another aspect, when this image is an image corresponding to the detection sample, processing performed on this image is the same as that in 1), so that the target detection parameter corresponding to the classification of this image can be acquired.

On the basis of the foregoing processing, the weight transfer function can be determined on the basis of the plurality of segmentation samples corresponding to the classification set A; in addition, the target detection parameter corresponding to each classification in A∪B is determined on the basis of the plurality of segmentation samples corresponding to the classification set A and the plurality of damage detection samples corresponding to the classification set B.

2. The target detection parameter corresponding to each classification in A∪B is inputted to the weight transfer function, and a target segmentation parameter corresponding to each classification is acquired, so as to determine the damage segmentation model used to perform damage segmentation on a vehicle damage image corresponding to the damage classification in A∪B.

In view of the above, by using the method for damage segmentation provided by the embodiments of the specification, on the basis of segmentation samples corresponding to a first classification subset and labeled with both a target detection result and a target segmentation result and damage detection samples corresponding to a second classification subset and labeled with a target detection result but not labeled with a target segmentation result, a target detection parameter and a target segmentation parameter corresponding to each classification in a classification set consisting of the first classification subset and the second classification subset can be determined, so as to determine a damage segmentation model used to perform damage segmentation on a vehicle damage image.

According to an embodiment of another aspect, a method for performing component segmentation on a vehicle damage image is further provided. FIG. 8 is a flowchart of a method for performing component segmentation on a vehicle damage image according to an embodiment. The method is executed by a device having a processing capability: a server, a system, or an apparatus. As shown in FIG. 8, a process of the method includes the following steps: step S810, acquire a plurality of segmentation samples labeled with both a target detection result and a target segmentation result, wherein a plurality of classifications with which target objects are labeled in these segmentation samples constitute a third classification subset; step S820, acquire a plurality of component detection samples labeled with a target detection result but not labeled with a target segmentation result, wherein a plurality of classifications with which target objects are labeled in these detection samples constitute a fourth classification subset, and the fourth classification subset includes classifications not belonging to the third classification subset; and step S830, use the plurality of segmentation samples and the plurality of component detection samples to train a component segmentation model, the model including a target detection parameter for detecting a component object and a target segmentation parameter for determining an outline of the component object.

Firstly, in step S810, acquire a plurality of segmentation samples labeled with both a target detection result and a target segmentation result, wherein a plurality of classifications with which target objects are labeled in these segmentation samples constitute a third classification subset.

In an embodiment, the plurality of segmentation samples can include segmentation samples having an outline feature similar to that of a component, such as leaf segmentation samples of a variety of plants.

In another embodiment, the plurality of segmentation samples include a plurality of component segmentation samples in which target objects are component objects.

It should be noted that a vehicle includes a large variety of components, and the classifications corresponding to a plurality of acquired component segmentation samples are generally part of vehicle components, and may, in an example, account for ⅓ or ¼ of all vehicle component classifications. For vehicle components of other classifications, component detection samples corresponding thereto are easy to acquire, but component segmentation samples labeled with segmentation results are difficult to acquire. For example, in vehicle accidents, some vehicle components are unlikely to be damaged, and therefore a limited number of vehicle damage images related thereto exist. In addition, costs of labeling segmentation results are high, so that it is unlikely that segmentation results of such components are manually labeled, and therefore it is difficult to acquire segmentation samples of these components.

In addition, it should be noted that for descriptions of step S810 to step S830, reference can also be made to the foregoing descriptions of step S310 to step S330, and details will not be described herein again.

In view of the above, by using the method for component segmentation provided by the embodiments of the specification, on the basis of segmentation samples corresponding to a third classification subset and labeled with both a target detection result and a target segmentation result and component detection samples corresponding to a fourth classification subset and labeled with a target detection result but not labeled with a target segmentation result, a target detection parameter and a target segmentation parameter corresponding to each classification in a classification set consisting of the third classification subset and the fourth classification subset can be determined, so as to determine a component segmentation model used to perform component segmentation on a vehicle damage image.

Figure 9:
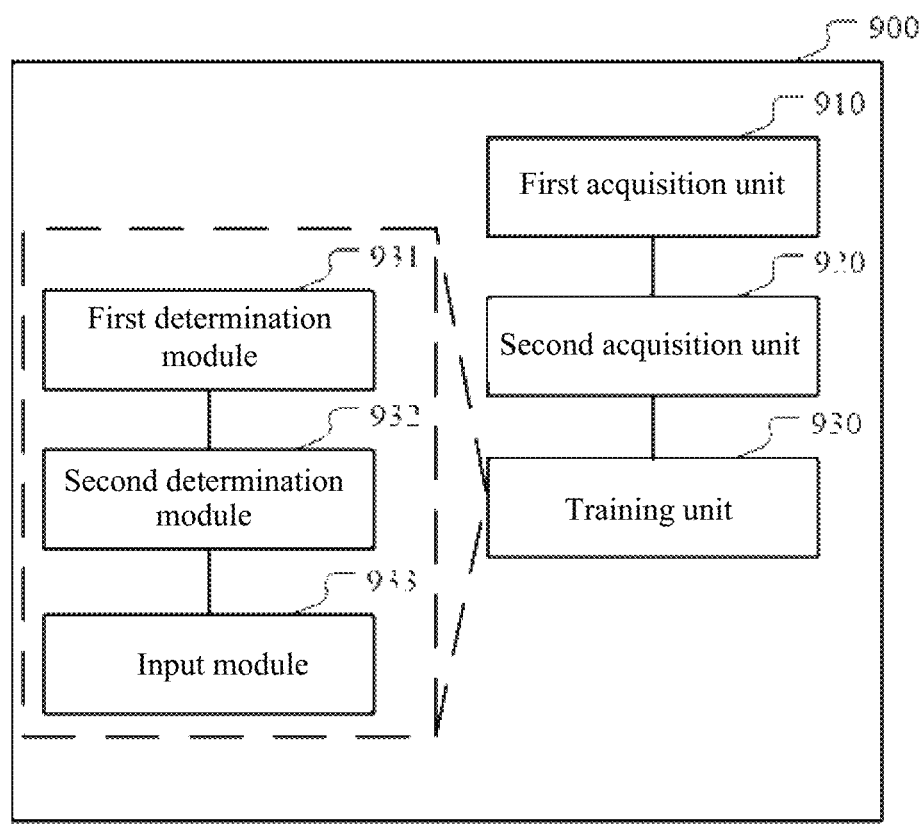
FIG. 9 is a structural diagram of an apparatus for performing damage segmentation on a vehicle damage image according to an embodiment.

According to an embodiment of another aspect, an apparatus for performing damage segmentation is further provided. FIG. 9 is a structural diagram of an apparatus for performing damage segmentation on a vehicle damage image according to an embodiment. As shown in FIG. 9, the apparatus includes:

a first acquisition unit 910, configured to acquire a plurality of segmentation samples labeled with both a target detection result and a target segmentation result, wherein the target detection result includes a classification and a boundary box of a target object, and the target segmentation result includes an outline of the target object; a plurality of classifications with which the target objects are labeled in the plurality of segmentation samples constitute a first classification subset;

a second acquisition unit 920, configured to acquire a plurality of damage detection samples labeled with a target detection result but not labeled with a target segmentation result, wherein a plurality of classifications with which target objects are labeled in the plurality of damage detection samples constitute a second classification subset, and the second classification subset includes classifications not belonging to the first classification subset; and a training unit 930, configured to use the plurality of segmentation samples and the plurality of damage detection samples to train a damage segmentation model, the damage segmentation model including a target detection parameter for detecting a damage object and a target segmentation parameter for determining an outline of the damage object; wherein the training unit 930 specifically includes:

a first determination module 931, configured to determine, on the basis of the target detection results in the plurality of segmentation samples and the target detection results in the plurality of damage detection samples, a target detection parameter corresponding to each classification in a classification set consisting of the first classification subset and the second classification subset;

a second determination module 932, configured to determine, on the basis of the target detection results and the target segmentation results in the plurality of segmentation samples, a weight transfer function, the weight transfer function indicating a mapping from the target detection parameter to the target segmentation parameter; and an input module 933, configured to input the target detection parameter corresponding to each classification to the weight transfer function to obtain a target segmentation parameter corresponding to each classification, so as to determine the damage segmentation model used to perform damage segmentation on a vehicle damage image.

According to an embodiment, the first classification subset includes a first classification, and the second determination module 932 is specifically configured to:

acquire a target detection parameter corresponding to the first classification;

input the target detection parameter corresponding to the first classification to an initial weight transfer function, and acquire a corresponding predictive target segmentation parameter;

determine, on the basis of the predictive target segmentation parameter, a predicted target segmentation result corresponding to a segmentation sample of the first classification; and adjust the initial weight transfer function at least on the basis of the predicted target segmentation result and the target segmentation result with which the segmentation sample of the first classification is labeled.

Further, in a specific embodiment, the target detection parameter corresponding to the first classification includes a target classification parameter and a target boundary box parameter; the input module 933 is specifically configured to:

input the target classification parameter and/or the target boundary box parameter to the initial weight transfer function.

According to an embodiment, the weight transfer function is implemented by means of a convolutional neural network.

According to an embodiment, the plurality of segmentation samples include a plurality of component segmentation samples in which target objects are component objects.

According to an embodiment, the plurality of segmentation samples include a plurality of damage segmentation samples in which target objects are damage objects.

Further, in a specific embodiment, the first acquisition unit 910 is specifically configured to:

acquire a predetermined quantity of damage detection samples from a damage sample library;

extract, on the basis of salience detection, a plurality of salient regions from a plurality of boundary boxes labeled in the predetermined quantity of damage detection samples, so that a staff member labels a portion of the predetermined quantity of damage detection samples with segmentation results according to the plurality of salient regions;

determine, as the plurality of damage segmentation samples, the portion of the predetermined quantity of damage detection samples labeled with the segmentation results; and determine the rest of the predetermined quantity of damage detection samples as the plurality of damage detection samples.

In view of the above, by using the apparatus for damage segmentation provided by the embodiments of the specification, on the basis of segmentation samples corresponding to a first classification subset and labeled with both a target detection result and a target segmentation result and damage detection samples corresponding to a second classification subset and labeled with a target detection result but not labeled with a target segmentation result, a target detection parameter and a target segmentation parameter corresponding to each classification in a classification set consisting of the first classification subset and the second classification subset can be determined, so as to determine a damage segmentation model used to perform damage segmentation on a vehicle damage image.

Figure 10:
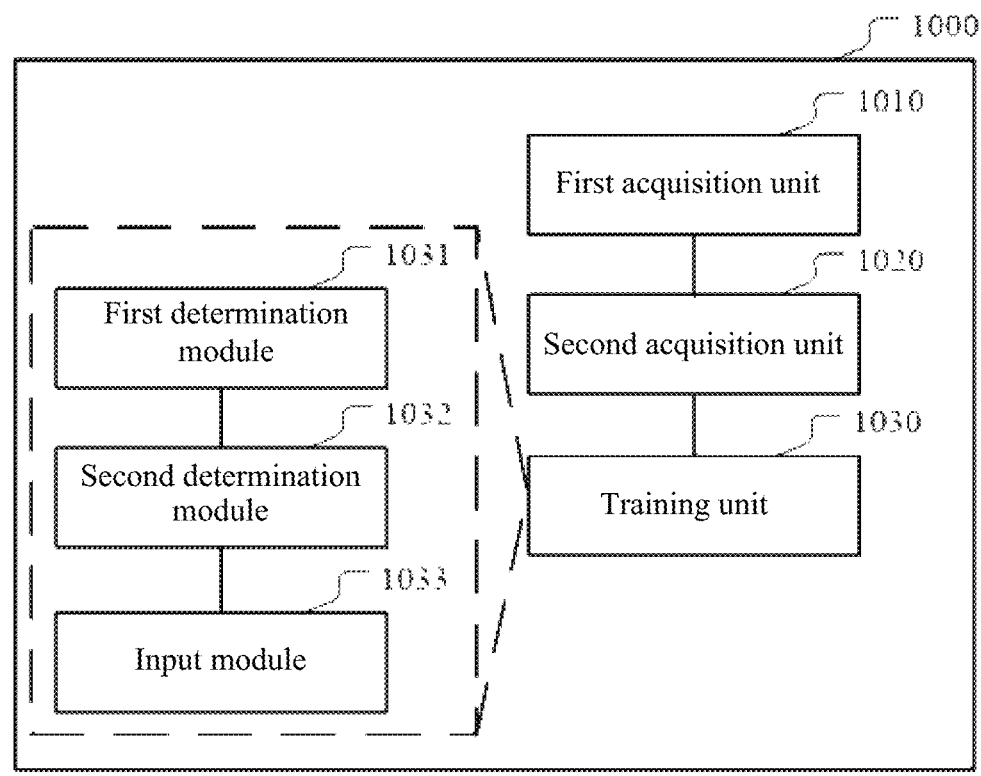
FIG. 10 is a structural diagram of an apparatus for performing component segmentation on a vehicle damage image according to an embodiment.

According to an embodiment of another aspect, an apparatus for performing component segmentation is further provided. FIG. 10 is a structural diagram of an apparatus for performing component segmentation on a vehicle damage image according to an embodiment. As shown in FIG. 10, the apparatus includes:

a first acquisition unit 1010, configured to acquire a plurality of segmentation samples labeled with both a target detection result and a target segmentation result, wherein the target detection result includes a classification and a boundary box of a target object, and the target segmentation result includes an outline of the target object; a plurality of classifications with which the target objects are labeled in the plurality of segmentation samples constitute a third classification subset;

a second acquisition unit 1020, configured to acquire a plurality of component detection samples labeled with a target detection result but not labeled with a target segmentation result, wherein a plurality of classifications with which target objects are labeled in the plurality of component detection samples constitute a fourth classification subset, and the fourth classification subset includes classifications not belonging to the third classification subset; and a training unit 1030, configured to use the plurality of segmentation samples and the plurality of component detection samples to train a component segmentation model, the component segmentation model including a target detection parameter for detecting a component object and a target segmentation parameter for determining an outline of the component object; wherein the training unit 1030 specifically includes:

a first determination module 1031, configured to determine, on the basis of the target detection results in the plurality of segmentation samples and the target detection results in the plurality of component detection samples, a target detection parameter corresponding to each classification in a classification set consisting of the third classification subset and the fourth classification subset;

a second determination module 1032, configured to determine, on the basis of the target detection results and the target segmentation results in the plurality of segmentation samples, a weight transfer function, the weight transfer function indicating a mapping from the target detection parameter to the target segmentation parameter; and an input module 1033, configured to input the target detection parameter corresponding to each classification to the weight transfer function to obtain a target segmentation parameter corresponding to each classification, so as to determine the component segmentation model used to perform component segmentation on a vehicle damage image.

In another embodiment, the plurality of segmentation samples include a plurality of component segmentation samples in which target objects are component objects.

In view of the above, by using the apparatus for component segmentation provided by the embodiments of the specification, on the basis of segmentation samples corresponding to a third classification subset and labeled with both a target detection result and a target segmentation result and component detection samples corresponding to a fourth classification subset and labeled with a target detection result but not labeled with a target segmentation result, a target detection parameter and a target segmentation parameter corresponding to each classification in a classification set consisting of the third classification subset and the fourth classification subset can be determined, so as to determine a component segmentation model used to perform component segmentation on a vehicle damage image.

According to an embodiment of another aspect, a computer-readable storage medium is further provided, on which a computer program is stored, wherein the computer program, when executed on a computer, causes the computer to perform the method described with reference to FIG. 3, FIG. 4, FIG. 6, or FIG. 8.

According to an embodiment of another aspect, a computing device is further provided, including a memory and a processor, wherein the memory stores executable code, and the processor, when executing the executable code, implements the method described with reference to FIG. 3, FIG. 4, FIG. 6, or FIG. 8.

Figure 11:
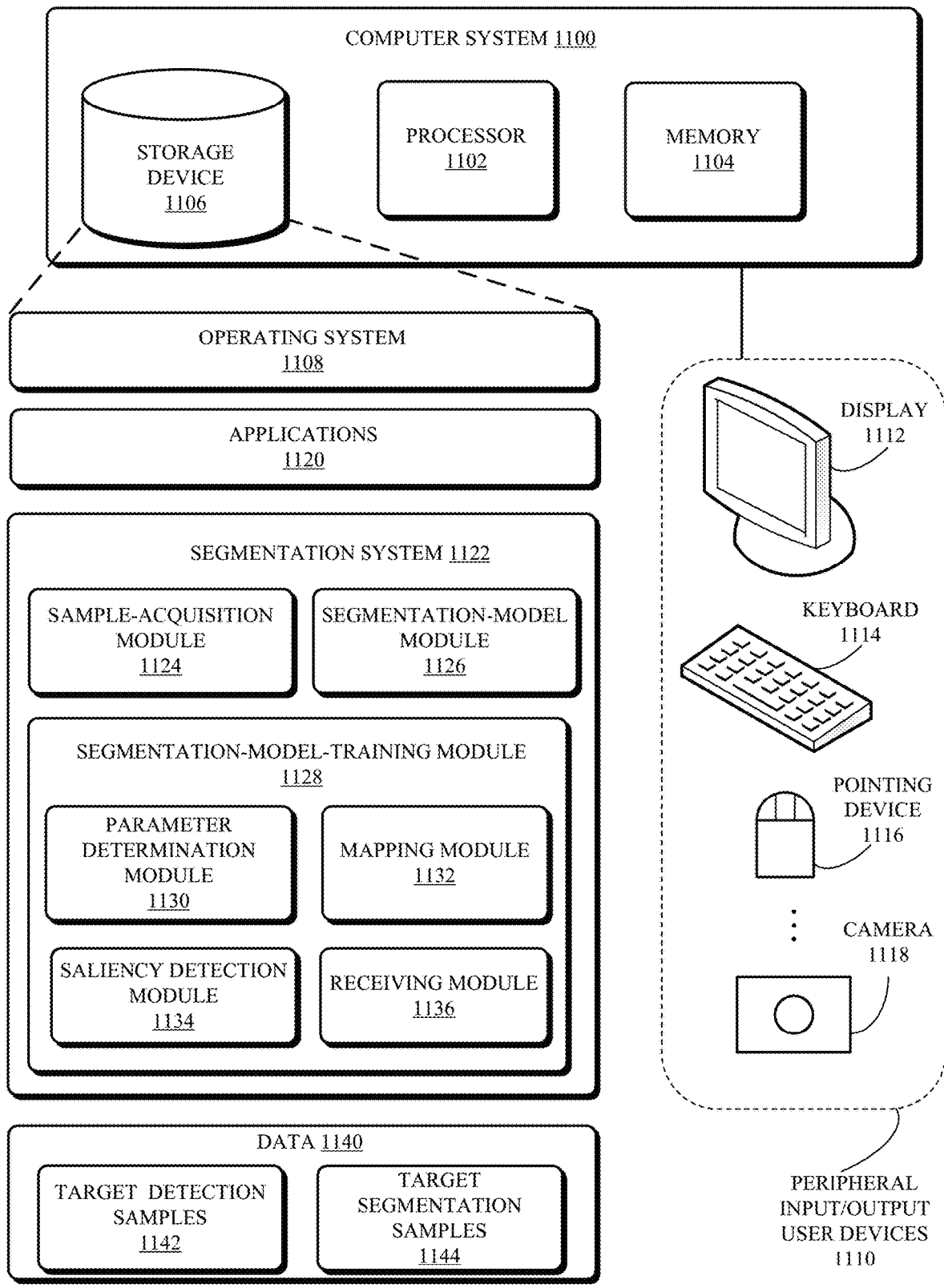
FIG. 11 illustrates an exemplary computer and communication system for damage segmentation on a vehicle damage image according to one embodiment.

FIG. 11 illustrates an exemplary computer and communication system for damage segmentation on a vehicle damage image according to one embodiment. In FIG. 11, computer system 1100 can include a processor 1102, a memory 1104, and a storage device 1106. Furthermore, computer system 1100 can be coupled to peripheral input/output (I/O) user devices 1110, e.g., a display device 1112, a keyboard 1114, a pointing device 1116, and a camera 1118. Storage device 1106 can store an operating system 1108, one or more applications 1120, a segmentation system 1122, and data 1140.

Applications 1120 can include instructions, which can be loaded from storage device 1106 into memory 1104 and executed by processor 1102. As a result, computer system 1100 can perform specific functions provided by applications 1120.

Segmentation system 1122 can include instructions, which when executed by computer system 1100, can cause computer system 1100 or processor 1102 to perform methods and/or processes described in this disclosure. Specifically, segmentation system 1122 can include instructions for acquiring a plurality of samples, including both target detection samples and segmentation samples (sample-acquisition module 1124), instructions for implementing a segmentation model (segmentation-model module 1126), and instructions for training the segmentation model using the target detection samples and the segmentation samples (segmentation-model-training module 1128). Moreover, segmentation-model-training module 1128 further comprises instructions for determining the target detection parameters and target segmentation parameters for each sample classification (parameter-determination module 1130), instructions for determining a mapping between the target detection parameters and target segmentation parameters (mapping module 1132), instructions for detecting salient objects in damage detection samples (saliency detection module 1134), and instructions for receiving a manual segmentation labeling result (receiving module 1136). Note that the manual segmental labeling result can include manual segmentation labeling of a portion of target detection samples.

Data 1140 can include target detection samples 1142 and target segmentation samples 1144. More specifically, target detection samples 1142 can include damage detection samples and component detection samples, and target segmentation samples 1144 can include damage segmentation samples and component segmentation samples. If the segmentation model is trained using damage detection samples and damage segmentation samples, the model can be used to segment detected damages. On the other hand, if the segmentation model is trained using component detection samples and component segmentation samples, the model can be used to segment detected components. Once the segmentation model is trained, a user can upload an image (e.g., a vehicle damage image) captured by camera 1118, and the image is input into the trained segmentation model to obtain the damage classification and outline of the damage.

In some embodiments, applications 1120 and the various modules in sample-labeling system 1122, such as modules 1124, 1126, 1128, 1130, 1132, 1134, and 1136 can be partially or entirely implemented in hardware and can be part of processor 1102. Further, in some embodiments, the system may not include a separate processor and memory. Instead, in addition to performing their specific tasks, modules 1120, 1124, 1126, 1128, 1130, 1132, 1134, and 1136, either separately or in concert, may be part of general- or special-purpose computation engines.

Figure 12:
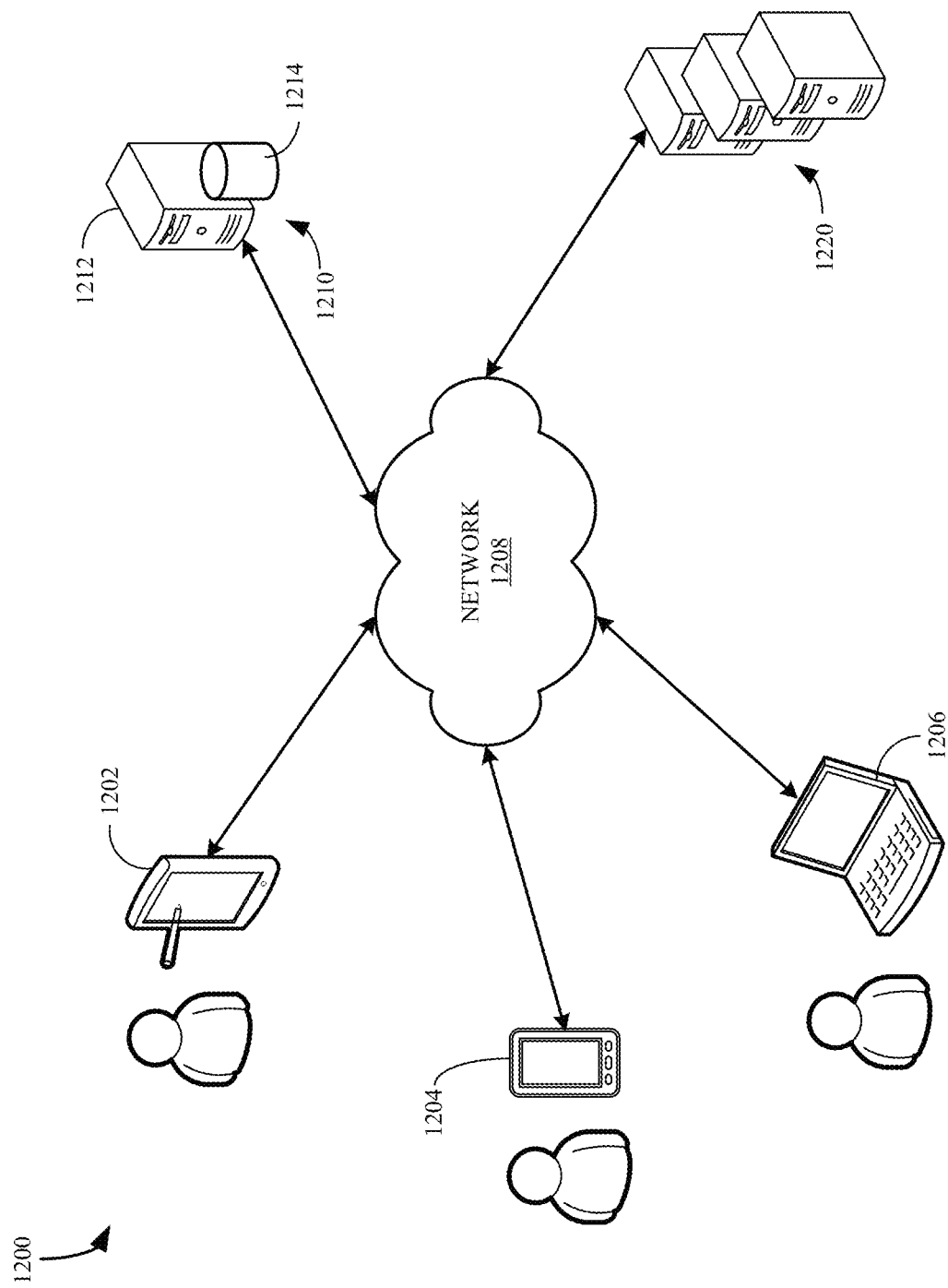
FIG. 12 illustrates an exemplary network environment for implementing the disclosed technology, in accordance with some embodiments described herein.

FIG. 12 illustrates an exemplary network environment for implementing the disclosed technology, in accordance with some embodiments described herein. A network environment 1200 includes a number of electronic devices 1202, 1204 and 1206 communicably connected to a server 1210 by a network 1208. One or more remote servers 1220 are further coupled to the server 1210 and/or the one or more electronic devices 1202, 1204 and 1206.

In some exemplary embodiments, electronic devices 1202, 1204 and 1206 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 1202, 1204 and 1206 store a user agent such as a browser or application. In the example of FIG. 12, electronic device 1202 is depicted as a tablet computer, electronic device 1204 is depicted as a smartphone, and electronic device 1206 is depicted as a laptop computer.

Server 1210 includes a processing device 1212 and a data store 1214. Processing device 1212 executes computer instructions stored in data store 1214, for example, to assist in scheduling a customer-initiated service or a service-provider-initiated service between a service provider and a customer at electronic devices 1202, 1204 and 1206 during a service scheduling process.

In some exemplary aspects, server 1210 can be a single computing device such as a computer server. In other embodiments, server 1210 can represent more than one computing device working together to perform the actions of a server computer (e.g., cloud computing). The server 1210 may host the web server communicably coupled to the browser at the client device (e.g., electronic devices 1202, 1204 or 1206) via network 1208. In one example, the server 1210 may host a client application for scheduling a customer-initiated service or a service-provider-initiated service between a service provider and a customer during a service scheduling process. Server 1210 may further be in communication with one or more remote servers 1220 either through the network 1208 or through another network or communication means.

The one or more remote servers 1220 may perform various functionalities and/or storage capabilities described herein with regard to the server 1210, either alone or in combination with server 1210. Each of the one or more remote servers 1220 may host various services. For example, servers 1220 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 1220 can be a single computing device such as a computer server or can represent more than one computing device working together to perform the actions of a server computer (e.g., cloud computing). In one embodiment server 1210 and one or more remote servers 1220 may be implemented as a single server or a cluster of servers. In one example, server 1210 and one or more remote servers 1220 may communicate through the user agent at the client device (e.g., electronic devices 1202, 1204 or 1206) via network 1208.

Users may interact with the system hosted by server 1210, and/or one or more services hosted by remote servers 1220, through a client application installed at the electronic devices 1202, 1204, and 1206. Alternatively, the user may interact with the system through a web-based browser application at the electronic devices 1202, 1204, and 1206. Communication among client devices 1202, 1204, 1206 and the system, and/or one or more services, may be facilitated through a network (e.g., network 1208).

Communication among the client devices 1202, 1204, 1206, server 1210 and/or one or more remote servers 1220 may be facilitated through various communication protocols. In some aspects, client devices 1202, 1204, 1206, server 1210 and/or one or more remote servers 1220 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 1208 can include, for example, any one or more of a personal area network (PAN), a local area network (LAN), a campus area network (CAN), a metropolitan area network (MAN), a wide area network (WAN), a broadband network (BBN), the Internet, and the like. Further, network 1208 can include, but is not limited to, any one or more of the following network topologies, including a bus network, a star network, a ring network, a mesh network, a star-bus network, a tree or hierarchical network, and the like.

A person skilled in the art may be aware that in the aforementioned one or plurality of examples, the functions described in the plurality of embodiments disclosed in the specification can be implemented by hardware, software, firmware, or any combination thereof. When implemented by software, these functions may be stored in a computer-readable medium, or transmitted as one or a plurality of instructions or as one or a plurality of pieces of code in the computer-readable medium.

The objectives, the technical solutions, and the beneficial effects of the plurality of embodiments disclosed in the specification are further described in detail in the foregoing specific implementation. It should be understood that the foregoing descriptions are merely specific implementation of the plurality of embodiments disclosed in the specification, and are not intended to limit the protection scope of the plurality of embodiments disclosed in the specification. Any modification, equivalent replacement, and improvement made on the basis of the technical solutions of the plurality of embodiments disclosed in the specification shall fall within the protection scope of the specification.

What is claimed is:

1. A method for performing segmentation on a vehicle damage image, the method comprising:
    obtaining a plurality of labeled segmentation samples of vehicle images, wherein a respective labeled segmentation sample includes a boundary box of a target object, a classification of the target object, and an outline of the target object;
    obtaining a plurality of labeled target detection samples of vehicle images, wherein a respective labeled target detection sample includes a boundary box of a target object and a classification of the target object; and
    training, by a computer, a segmentation model, which comprises:
        determining, based on the plurality of labeled segmentation samples, a weight-transfer function indicating a mapping between a target detection parameter for detecting target objects associated with a respective classification and a target segmentation parameter for determining outlines of the target objects of the corresponding classification;
        determining a target detection parameter corresponding to each classification; and
        obtaining a target segmentation parameter for each classification based on the corresponding target detection parameter and the weight-transfer function, thereby determining the segmentation model for performing segmentation on the vehicle damage image.

2. The method according to claim 1, wherein determining the weight-transfer function further comprises:
    obtaining a target detection parameter corresponding to a first classification;
    obtaining a corresponding predictive target segmentation parameter based on an initial weight-transfer function and the target detection parameter corresponding to the first classification;
    determining, based on the predictive target segmentation parameter, a predicted outline of a target object corresponding to a labeled segmentation sample associated with the first classification; and
    adjusting the initial weight-transfer function based at least on the predicted outline and the labeled outline of the target object.

3. The method according to claim 2, wherein the target detection parameter corresponding to the first classification comprises a target classification parameter and a target boundary box parameter, and wherein obtaining a corresponding predictive target segmentation parameter comprises:
    obtaining the corresponding predictive target segmentation parameter based on the target classification parameter and/or the target boundary box parameter, and the initial weight-transfer function.

4. The method according to claim 1, wherein determining the weight-transfer function comprises training a convolutional neural network using the plurality of labeled segmentation samples.

5. The method according to claim 1, wherein the plurality of labeled target detection samples comprise a plurality of labeled damage detection samples in which target objects are objects indicating vehicle damage, and wherein the segmentation model is used to perform damage segmentation on the vehicle damage image.

6. The method according to claim 1, wherein the plurality of labeled target detection samples comprise a plurality of labeled component detection samples in which target objects are vehicle components, and wherein the segmentation model is used to perform component segmentation on the vehicle damage image.

7. The method according to claim 1, wherein the plurality of labeled segmentation samples comprise a plurality of labeled damage segmentation samples in which target objects are objects indicating vehicle damage.

8. The method according to claim 7, wherein obtaining the plurality of labeled segmentation samples comprises:
obtaining a predetermined quantity of labeled damage detection samples from a sample library;
extracting, using a salience detection technique, a salient region from a boundary box in each labeled damage detection sample from the predetermined quantity of labeled damage detection samples;
receiving a manual segmentation result for a portion of the predetermined quantity of labeled damage detection samples according to salient regions extracted from the portion of the predetermined quantity of labeled damage detection samples;
including the portion of the predetermined quantity of labeled damage detection samples in the plurality of labeled segmentation samples; and
including rest of the predetermined quantity of labeled damage detection samples in the plurality of labeled damage detection samples.

9. The method according to claim 1, wherein the plurality of labeled segmentation samples comprise a plurality of labeled component segmentation samples in which target objects are vehicle components.

10. An apparatus for performing damage segmentation on a vehicle damage image, the apparatus comprising:
a first sample-acquisition unit configured to acquire a plurality of labeled segmentation samples of vehicle images, wherein a respective labeled segmentation sample includes a boundary box of a target object, a classification of the target object, and an outline of the target object;
a second sample-acquisition unit configured to acquire a plurality of labeled target detection samples of vehicle images, wherein a respective labeled target detection sample includes a boundary box of a target object and a classification of the target object; and
a training unit configured to train a segmentation model, wherein the training unit comprises:
a first determination module configured to determine, based on the plurality of labeled segmentation samples, a weight-transfer function indicating a mapping between a target detection parameter for detecting target objects associated with a respective classification and a target segmentation parameter for determining outlines of the target objects of the corresponding classification;
a second determination module configured to determine a target detection parameter corresponding to each classification associated with the labeled target detection samples; and
a parameter-obtaining module configured to obtain a target segmentation parameter for each classification associated with the labeled target detection samples based on the corresponding target detection parameter and the weight-transfer function, thereby determining the segmentation model for performing segmentation on the vehicle damage image.

11. The apparatus according to claim 10, wherein, while determining the weight-transfer function, the first determination module is specifically configured to:
obtain a target detection parameter corresponding to a first classification;
obtain a corresponding predictive target segmentation parameter based on an initial weight-transfer function and the target detection parameter corresponding to the first classification;
determine, based on the predictive target segmentation parameter, a predicted outline of a target object corresponding to a labeled segmentation sample associated with the first classification; and
adjust the initial weight-transfer function based at least on the predicted outline and the labeled outline of the target object.

12. The apparatus according to claim 11, wherein the target detection parameter corresponding to the first classification comprises a target classification parameter and a target boundary box parameter, and wherein, while obtaining the corresponding predictive target segmentation parameter, the first determination module is configured to:
obtain the corresponding predictive target segmentation parameter based on the target classification parameter and/or the target boundary box parameter, and the initial weight-transfer function.

13. The apparatus according to claim 10, wherein, while determining the weight-transfer function, the first determination module trains a convolutional neural network using the plurality of labeled segmentation samples.

14. The apparatus according to claim 10, wherein the plurality of labeled target detection samples comprise a plurality of labeled damage detection samples in which target objects are objects indicating vehicle damage, and wherein the segmentation model is used to perform damage segmentation on the vehicle damage image.

15. The apparatus according to claim 10, wherein the plurality of labeled target detection samples comprise a plurality of labeled component detection samples in which target objects are vehicle components, and wherein the segmentation model is used to perform component segmentation on the vehicle damage image.

16. The apparatus according to claim 10, wherein the plurality of labeled segmentation samples comprise a plurality of labeled damage segmentation samples in which target objects are objects indicating vehicle damage.

17. The apparatus according to claim 16, wherein, while acquiring the plurality of labeled segmentation samples, the first sample-acquisition unit is configured to:
acquire a predetermined quantity of labeled damage detection samples from a sample library;
extract, using a salience detection technique, a salient region from a boundary box in each labeled damage detection sample from the predetermined quantity of labeled damage detection samples;
receive a manual segmentation result for a portion of the predetermined quantity of labeled damage detection samples according to salient regions extracted from the portion of the predetermined quantity of labeled damage detection samples;
include the portion of the predetermined quantity of labeled damage detection samples in the plurality of labeled segmentation samples; and
include rest of the predetermined quantity of labeled damage detection samples in the plurality of labeled damage detection samples.

18. The apparatus according to claim 10, wherein the plurality of labeled segmentation samples comprise a plurality of labeled component segmentation samples in which target objects are vehicle components.

19. A non-transitory computer-readable storage medium storing instructions that when executed by a computer cause the computer to perform a method for performing segmentation on a vehicle damage image, the method comprising:

obtaining a plurality of labeled segmentation samples of vehicle images, wherein a respective labeled segmentation sample includes a boundary box of a target object, a classification of the target object, and an outline of the target object;

obtaining a plurality of labeled target detection samples of vehicle images, wherein a respective labeled target detection sample includes a boundary box of a target object and a classification of the target object; and training a segmentation model, which comprises:

determining, based on the plurality of labeled segmentation samples, a weight-transfer function indicating a mapping between a target detection parameter for detecting target objects associated with a respective classification and a target segmentation parameter for determining outlines of the target objects of the corresponding classification;

determining a target detection parameter corresponding to each classification associated with the labeled target detection samples; and obtaining a target segmentation parameter for each classification associated with the labeled target detection samples based on the corresponding target detection parameter and the weight-transfer function, thereby determining the segmentation model for performing segmentation on the vehicle damage image.

20. The non-transitory computer-readable storage medium of claim 19, wherein determining the weight-transfer function further comprises:

obtaining a target detection parameter corresponding to a first classification;

obtaining a corresponding predictive target segmentation parameter based on an initial weight-transfer function and the target detection parameter corresponding to the first classification;

determining, based on the predictive target segmentation parameter, a predicted outline of a target object corresponding to a labeled segmentation sample associated with the first classification; and adjusting the initial weight-transfer function based at least on the predicted outline and the labeled outline of the target object.

* * * * *